United States Patent [19]
König

[11] Patent Number: 4,480,498
[45] Date of Patent: Nov. 6, 1984

[54] GUIDE CONTROL ROD FOR WHEEL SUSPENSIONS OF MOTOR VEHICLES

[75] Inventor: Werner König, Stuttgart, Fed. Rep. of Germany

[73] Assignee: Daimler-Benz Aktiengesellschaft, Fed. Rep. of Germany

[21] Appl. No.: 527,193

[22] Filed: Aug. 26, 1983

Related U.S. Application Data

[63] Continuation of Ser. No. 219,372, Dec. 22, 1980.

[30] Foreign Application Priority Data

Dec. 22, 1979 [DE] Fed. Rep. of Germany ....... 2952176

[51] Int. Cl.³ .......................... G05G 1/00; G05G 3/00
[52] U.S. Cl. ..................................... 74/579 R; 74/588
[58] Field of Search ............. 74/579 R, 588; 403/188, 403/380, 384, 388; 29/463, 525, 450

[56] References Cited

U.S. PATENT DOCUMENTS

| | | | |
|---|---|---|---|
| 673,748 | 5/1901 | Howe | 474/231 |
| 919,669 | 4/1909 | Wilson | 74/579 |
| 1,146,905 | 7/1915 | Stark | 474/231 |
| 1,734,960 | 11/1927 | Brockschmidt | 474/231 |
| 2,568,649 | 9/1951 | McIntosh et al. | 474/231 |
| 3,007,713 | 11/1961 | Schilberg | 280/104.5 |
| 3,121,348 | 2/1964 | Reed | 74/588 |
| 4,020,937 | 3/1977 | Winter | 29/463 |
| 4,257,155 | 3/1981 | Hunter | 29/525 |
| 4,265,134 | 5/1981 | Dupoyet | 474/231 |

FOREIGN PATENT DOCUMENTS

| | | | |
|---|---|---|---|
| 7245258 | 4/1973 | Fed. Rep. of Germany . | |
| 979878 | 5/1951 | France | 474/230 |
| 1093664 | 5/1955 | France | 74/588 |
| 1318708 | 12/1963 | France | 74/588 |
| 486862 | 11/1953 | Italy | 74/588 |

Primary Examiner—Lawrence J. Staab
Assistant Examiner—Michael Bednarek
Attorney, Agent, or Firm—Craig & Burns

[57] ABSTRACT

A guide control rod for a wheel suspension arrangement of motor vehicles. The guide control rod includes spaced side walls extending in a longitudinal direction with guide sockets being positioned in an area of the respective ends of the guide control rods. Each side wall is formed by a single stamped or pressed plate element. The guide sockets are formed by collar portions which define mounting openings extending through the respective side walls. The collar portions have different diameters so as to enable the collar portions of the respective plate members to be pressed onto one another, thereby connecting the two plate members to each other.

10 Claims, 1 Drawing Figure

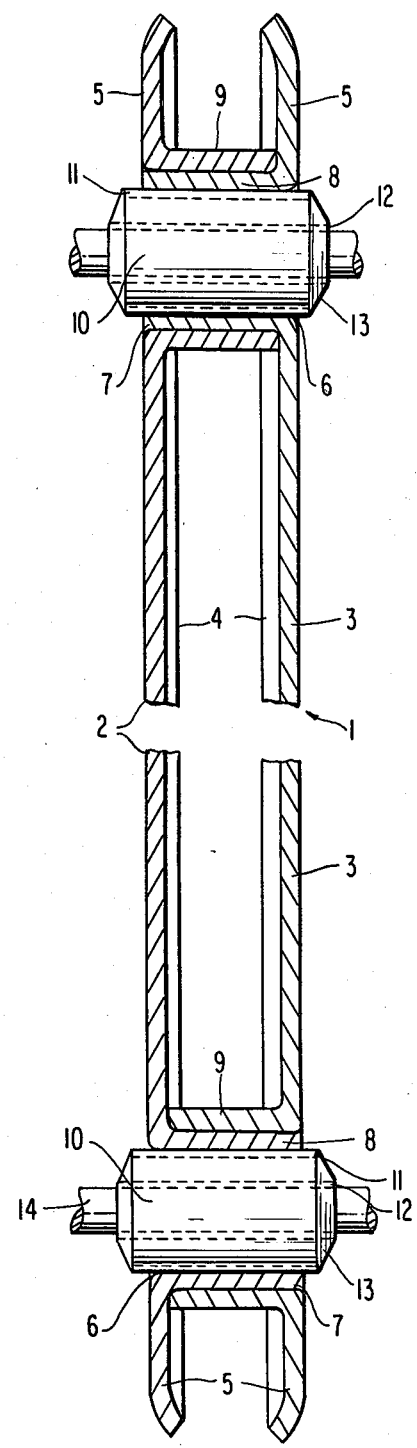

GUIDE CONTROL ROD FOR WHEEL SUSPENSIONS OF MOTOR VEHICLES

This is a continuation of application Ser. No. 219,372 filed Dec. 22, 1980.

BACKGROUND OF THE INVENTION

The present invention relates to a guide arrangement and, more particularly, to a guide control rod for a wheel suspension arrangement of motor vehicles. The guide control rod includes longitudinally extending spaced side walls formed by stamped or pressed plate members, with guide sockets positioned in end areas of the control rod. The guide sockets, formed by mounting openings in the side walls, are each constructed with rim or border-like collars, with the collars of the plate members being spaced from and disposed in a direction facing each other.

Guide control rods have been proposed wherein a single stamped or pressed element is provided and formed so as to have a U-shaped cross-sectional configuration. The legs of the U-shape define side walls of the guide control rod and mounting openings extend through the side walls in end areas of the control rod. The mounting openings have a circular shape with borders formed on collars. The collars in the side walls are spaced from each other and point in a direction facing each other.

In order to reduce the weight of the guide control rod, it is possible to reduce the thickness of the plate members; however, such a reduction in the thickness of the plate members results in a loss of stability in the guide control rod, especially in an area of the guide sockets.

The aim underlying the present invention essentially resides in providing a guide control rod for wheel suspensions of motor vehicles formed of stamped or pressed members or parts, which enables a reduction in a thickness of the plates or parts while nevertheless maintaining the necessary stability for the guide control rod.

SUMMARY AND OBJECTS OF THE INVENTION

In accordance with advantageous features of the present invention, a guide control rod for a wheel suspension system of a motor vehicle is provided wherein each side wall of the control rod is formed by a single stamped or pressed, preferably dish-shaped plate member, with respective ends of the plate members being provided with projecting collar portions. The projecting collar portions of the respective plate members are adapted to be pressed or fitted together and, for this purpose, the collars on the respective plate members are of differing diameters.

By pressing the respective collars of the plate members onto each other, it is possible to obtain an additional reinforcement of the guide sockets so as to minimize, if not avoid, any risks of the occurrence of a bulging or deformation of the guide sockets when the guide control rod is subjected to normal working stresses.

Advantageously, in accordance with the present invention, the smaller diameter collars are provided with an axial length which is sufficient so as to enable the smaller diameter collars to extend over an entire width of the guide control rod and form a closed guide surface around the entire mounting area of the guide socket.

It is also possible in accordance with the present invention to provide the larger diameter collars with a sufficient axial length so as to enable the larger diameter collars to overlap the smaller diameter collars over their entire axial length. By virtue of the overlapping of the smaller and larger diameter collars, it is possible to obtain an optimum combining or connecting of the side walls of the guide control rod as well as an optimum reinforcement of the guide sockets of the guide control rod.

Accordingly, it is an object of the present invention to provide a guide control rod for wheel suspensions of motor vehicles which avoids, by simple means, shortcomings and disadvantages encountered in the prior art.

Another object of the present invention resides in providing a guide control rod for wheel suspensions of motor vehicles which enables a reduction in the overall weight of the control rod.

Yet another object of the present invention resides in providing a guide control rod for wheel suspensions of motor vehicles which is simple in construction and therefore relatively inexpensive to manufacture.

A further object of the present invention resides in providing a guide control rod for wheel suspensions of motor vehicles wherein the respective thicknesses of the elements forming the guide control rod are reduced while nevertheless obtaining the necessary stability for proper functioning.

These and other objects, features, and advantages of the present invention will become more apparent from the following description when taken in connection with the accompanying drawing, which shows, for the purposes of illustration only, one embodiment in accordance with the present invention, and wherein:

BRIEF DESCRIPTION OF THE DRAWINGS

The single FIGURE is a cross-sectional view through guide sockets accommodating flexible bearing elements arranged in end areas of a guide control rod for wheel suspensions of motor vehicles constructed in accordance with the present invention.

DESCRIPTION OF THE PREFERRED EMBODIMENT

Referring now to the single FIGURE of the drawing, wherein according to this FIGURE, a control guide rod generally designated by the reference numeral 1 for a wheel suspension arrangement of a motor vehicle includes two spaced concave or dish-shaped stamped or pressed plate members 2, 3. Each of the plate members 2, 3, terminates in an annular border portion 4. The plate members 2, 3 are arranged so that the respective border portions 4 face each other. Each of the plate members 2, 3 are provided with mounting openings 6, 7 of different diameters, wherein a smaller opening of one member is aligned with a larger opening at the other member and are respectively disposed on opposite end areas of the control guide rod 1. The mounting openings 6, 7 are respectively formed by spaced collars 8, 9 provided on the plate members 2, 3, which collars face each other. Acccordingly, each plate member 2, 3 has a pair of spaced openings, one smaller and one larger, and a smaller opening of one plate member is aligned with a larger opening of the other member.

In the illustrated embodiment, a mounting opening 7 is disposed at the upper end of the plate member 2 with a mounting opening 6 being disposed at the lower end of the plate member 2. A mounting opening 6 is disposed at the upper end of the plate member 3 and a mounting opening 7 is disposed at the lower end of the plate member 3.

As shown in the drawing, the mounting opening 6, formed by the collar 8 on each of the plate members 2, 3 is of a smaller diameter than the mounting opening 7 formed by the collar 9. The diameter of the larger mounting openings 7 in the respective plate members 2, 3 is dimensioned, with respect to the external diameter of the collar 8 of the mounting opening 6, so as to enable the two plate members 2, 3 to be connected with each other by a forced or pressed fit, resulting in the respective collars 8, 9 of one of the plate members being fixed relative to an associated respective collar 8, 9 of the other plate member. Preferably, each collar 8 has a length generally equal to the thickness of the assembled control rod 1 and each collar 9 has a length sufficient to overlap the entire length of the respective collar 8.

A flexible bearing element 10 is pressed into each of the mounting openings 6 and positioned so as to extend beyond either end of the collar 8. Each of the flexible bearing elements 10 include two concentrically disposed sockets 11, 12 of a different diameter fixedly arranged in a ring-shaped rubber element 13. A mounting stud 14 is accommodated in the respective inner metal sockets 12 so as to enable one end of the guide control rod 1 to be flexibly articulatingly supported at a body mounting (not shown) of the motor vehicle and, at the other end, to a wheel support (not shown) of the motor vehicle.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such changes and modifications as are encompassed by the scope of the appended claims.

I claim:

1. A guide lever for wheel suspensions of motor vehicles comprising a lever body having two shaped parts constructed to be elongated and dish-shaped, the parts being firmly connected with one another, the lever body having integral guide socket means transversely penetrating the lever body near an end of the lever body forwhich purpose openings are arranged coaxially with respect to one another in the shaped parts, an edge of the openings being shaped into a ring collar, each of the two shaped parts including guide socket means having a ring collar of a larger diameter and guide socket means having a ring collar of a smaller diameter, said guide socket means being formed by ring collars arranged coaxially with respect to one another on the shaped parts and one ring collar being pressed into the other ring collar whereby the shaped parts are adapted to be forced or press fitted together.

2. The guide lever according to claim 1, wherein a collar telescoped within another collar is smaller in diameter and has a length generally equal to a thickness of the lever body proximate the mounting socket.

3. The guide lever according to claim 2, wherein a collar having another collar telescoped therein is larger in diameter and overlaps the collar telescoped within by at least half of the length thereof.

4. The guide control rod according to claim 3, wherein the larger diameter collar have an axial length enabling an overlapping of an entire length of the smaller diameter collar.

5. A guide lever for wheel suspensions of motor vehicles comprising a lever body, said lever body formed by two shaped parts firmly connected to one another, each shaped part being elongated and dish-shaped and including integral guide socket means, each said guide socket means including an opening and a collar, each of the two shaped parts including guide socket means having a collar of a larger diameter and guide socket means having a collar of a smaller diameter, wherein a collar of one guide socket means of one shaped part is registrable and telescopically engageable with a collar of a guide socket means of the other shaped part whereby a mounting is formed by the registered and telescoped collars.

6. The guide lever according to claim 5, wherein a collar telescoped within another collar is smaller in diameter and has a length generally equal to a thickness of the lever body proximate the mounting socket.

7. The guide lever according to claim 6, wherein a collar having another collar telescoped therein is larger in diameter and overlaps the collar telescoped within by at least half of the length thereof.

8. A guide lever for wheel suspensions of motor vehicles comprising a lever body, said lever body formed by first and second shaped parts connected to one another, said first shaped part being elongated and dish-shaped and including integral first guide socket means, said first guide socket means including opening means and collar means having a predetermined wall thickness, said second shaped part being elongated and dish-shaped and including integral second guide socket means, said second guide socket means including opening means and collar means having a predetermined wall thickness, each of the two shaped parts including guide socket means having a collar of a larger diameter and guide socket means having a collar of a smaller diameter, each said collar of said first shaped part being registrable and telescopically engageable with a collar of said second shaped part whereby a reinforced mounting is formed by the registered and telescoped collars having a wall thickness generally twice the predetermined thickness of one of said collars.

9. The guide lever according to claim 8, wherein a collar telescoped within another collar is smaller in diameter and has a length generally equal to a thickness of the lever body proximate the mounting socket.

10. The guide lever according to claim 9, wherein a collar having another collar telescoped therein is larger in diameter and overlaps the collar telescoped within by at least half of the length thereof.

* * * * *